July 27, 1943.  M. J. ZALESKE  2,325,295
COWL FASTENER STUD CONSTRUCTION
Filed July 31, 1942
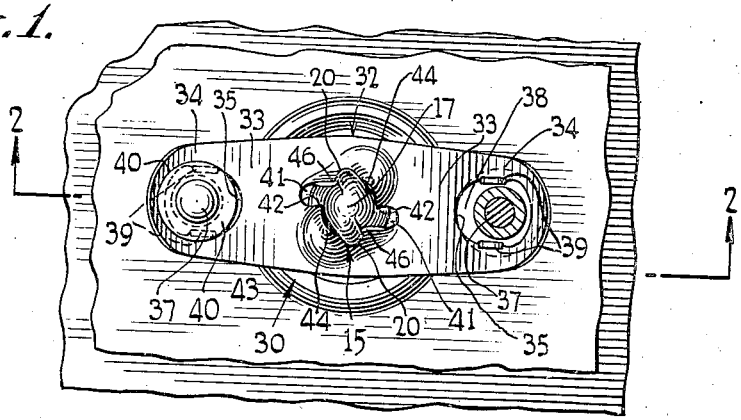
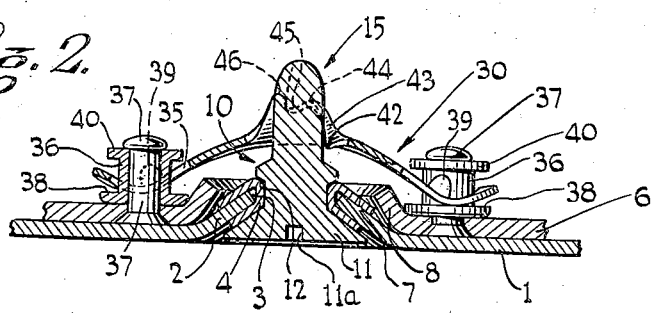
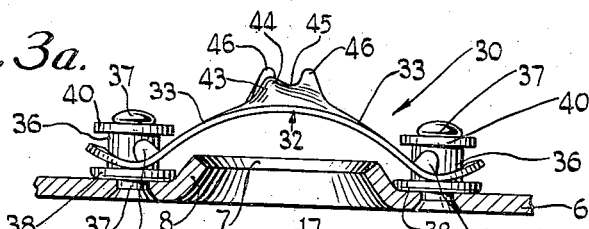
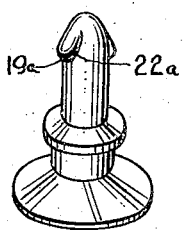
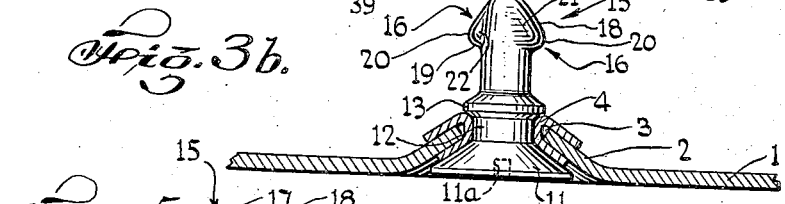
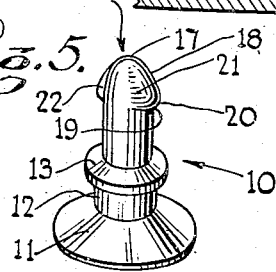
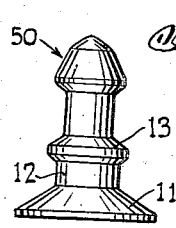
INVENTOR
MICHAEL J. ZALESKE
BY
ATTORNEYS Patented July 27, 1943

2,325,295

UNITED STATES PATENT OFFICE 2,325,295

COWL FASTENER STUD CONSTRUCTION

Michael J. Zaleske, Union, N. J., assignor, by mesne assignments, to Talon, Inc., Meadville, Pa., a corporation of Pennsylvania Application July 31, 1942, Serial No. 453,001

7 Claims. (Cl. 24—221)

This invention relates to fasteners of the rotary stud and spring type, to be used as cowl fasteners for aircraft and for other purposes. It deals particularly with the construction of the rotary stud element for such fasteners of that type as comprise a rotary stud having radial fastening arms and a mating spring strip element which receives an end of the stud and is formed with cam and radial groove means to cooperate with the stud arms. Such fasteners are disclosed, for example, in United States Patents Nos. 2,205,862 and 2,205,863.

Heretofore, the studs for such fasteners have been made with a cylindrical body from which straight stud arms have projected radially at right angles. The body is usually machined to cylindrical form, then drilled transversely near its fastening end and then fitted with a cross-pin which extends through the drill bore with its ends projecting as the stud arms. Upon heat treating the assembly to add hardness and strength the stud is ready for use.

Several problems are encountered in the use and also in the manufacture of such stud constructions. When a cowl sheet carrying the studs is separated from the sheet holding the spring elements the cross-pins sometimes catch on other structure, such as the margins or "dimplings" of the sheet openings, and thus interfere with the separation. This is particularly troublesome when separating sheets that are bowed, or curved, for some of the studs then must have a substantial lateral movement which increases their tendency to become caught or hung. Similarly, the fastening down of a cowl sheet sometimes is impeded because one or more of the stud arms catch against obstructions instead of entering freely into fastening relation to their mating spring elements. Occurrences of this sort may be quite serious if they delay the servicing or use of aircraft equipped with such fasteners.

Another problem exists in that the cross-pins tend to become loose as a result of the heat treating operations. This can be avoided by machining the arms as integral parts of the stud body, but to do that is time-consuming and increases the cost of manufacture, which is objectionably high in the usual practice. Furthermore, the ultimate strength of such fasteners is undesirably restricted by the strength of the cross-pins, especially where the dimensions must be small.

It is therefore the principal object of this invention to provide a new and improved construction and method of construction for the rotary stud element of such fasteners, by which to overcome the problems heretofore existing as above described. More specific objects of the invention are: To avoid the catching of stud arms against obstructions when either removing or fastening down a cowl sheet; to increase the efficiency of such fasteners when used on curved cowling or the like; to increase the ultimate strength of such fasteners by increasing the strength of the stud arms, and also by distributing the strain of the stud arms over a larger area of the cooperating spring strip element when the fastener is engaged; to simplify the manufacture of the stud elements and reduce their cost; and to avoid the losses and hazards heretofore occasioned by loose cross-pins or by other defects in the stud construction.

These and other objects and advantages are accomplished according to this invention by means of a stud construction and method of construction such as illustrated in the accompanying drawing and set forth fully in the following detailed description.

In the drawing,

Fig. 1 is a plan view of a stud and spring type fastener embodying the invention, with the elements in fastened relation;

Fig. 2 is a vertical section through the fastener assembly, taken approximately along line 2—2 of Fig. 1;

Fig. 3a and Fig. 3b are side elevations of the spring element and the stud element, respectively, in separated relation, the sheets to which the same are secured being shown in section;

Fig. 4 is an elevation of a stud blank as formed at one stage of the manufacture of the improved stud;

Fig. 5 is a perspective view of the stud in finished form, and

Fig. 6 shows a modified form of the stud element.

Referring to the drawing for illustrative details, the structure at 1 represents a cowl sheet or other part to be fastened in place, and the structure at 6 is a supporting sheet or other part to which to fasten the cowling. The complete fastener comprises a rotary stud element 10 secured to sheet 1 and a cooperating spring strip element 30 secured to the support 6 for "floating" movement in relation thereto.

The stud element, according to prior practice, is machined as a body having a head 11 at its outer end and an annular groove 12 between the head and a spaced ridge 13. Unlike known constructions, the inner end portion of the stud is formed with a novel fastening structure 15, illustrated in Figs. 1, 2, 3b and 5 of the drawings and described specifically hereinafter, which provides the radial fastening arms that interlock with the spring strip element. As seen in Fig. 2 and Fig. 3b, the cowl sheet 1 is formed with an opening 3 surrounded by a countersunk or dimpled portion 2 of this sheet. Opening 3 receives the rotary stud element, which is held therein by means of a grommet 4 or the like fitting into the annular groove 12. The countersinking of the sheet accommodates the stud head 11, which may be formed with means such as a slot 11a to fit a screwdriver, coin, or other tool by which to turn the stud element.

The spring element of the fastener may be constructed and mounted in various ways, since its structure per se forms no part of the present invention. The form illustrated is made according to United States Patents Nos. 2,205,862 and 2,205,863 and comprises the resilient sheetmetal strip 30 having a central portion 32 formed with a stud-receiving aperture, resilient portions 33 on opposite sides of the central portion and end portions 34 beyond the resilient portions. The end portions are formed with elongated openings 35 which embrace bushings 36 carried with the strip. The bushings have holes through which rivets 37 or other suitable attaching means may be inserted to secure the complete spring element to the sheet 6. They also have integral bases or flanges 38, which provide bearing surfaces for sliding movement of the end portions 34 and serve also to strengthen the assembly and avoid distortion of the sheet 6 during the rivetting operations. The spring strip itself is bowed, as shown in Fig. 2 and Fig. 3a, and when mounted in place it bridges an opening 7 in sheet 6 defined by "dimpling" 8 that accommodates the countersunk part 2 of the cowl sheet 1 when the fastener is engaged. Ears 39 on each end portion 34 cooperate with flanges 40 of the bushings to limit the freedom of movement of the spring strip 30 away from sheet 6. When the strip is compressed by the action of the stud element, as hereinafter described, its central portion 32 is drawn toward the dimpling 8 while the resilient portions 33 yield, or flex, and a lateral sliding movement of the end portions 34 takes place on the bearing surfaces of 38.

The aperture of the spring strip is extended at 41 (Fig. 1) to admit the radial arms of the stud element. The metal of the strip adjacent the aperture is drawn into a sort of inverted dish form having oppositely disposed structures to cooperate with the stud arms. Each of these structures includes an in-turned cam lip 42 merging into an upwardly extending arcuate cam surface 43 which in turn extends over a distinct hump 44 into a radial groove 45 that receives and holds one of the stud arms when the fastener is engaged. A projection or stop 46, provided by deformation of the metal next to groove 45, acts as a positive stop which prevents turning of the pin arm beyond the groove.

Referring now to the novel fastening structure 15 of the stud element: The inner end of the stud is formed with a rounded or domed shape, as indicated at 17, and with a pair of oppositely disposed integral projections 16, having the general shape of noses, which constitute the radial stud arms. These noses are disposed near the stud end, preferably with their upper surfaces 18 merging smoothly into, or tangent to, the surface of the domed end. The upper surfaces 18 are inclined longitudinally with respect to the axis of the stud and are rounded, or convex, in transverse direction. Each nose also has a tapered lower surface 19, which also is rounded, or convex, transversely and is inclined to the axis of the stud in a direction opposite to the inclination of the upper surface 18. The two surfaces 18 and 19 converge into a round end or point 20 for each stud arm. Finally, the side faces of the noses merge into the body of the stud as lateral continuations of the curved upper and lower surfaces. One side 21 preferably is curved so as to blend into the periphery of the stud body substantially tangent thereto. The other side 22, which is the leading face in clockwise rotation to engage the fastener, in this form is substantially flat and merges into the body as a plane parallel to the stud axis. It therefore abuts positively against the stop, such as 46, of the spring element when the fastener is engaged, and hence cannot be forced or cammed over the stop.

The manufacture of such a stud construction may be carried out by first turning suitable bar stock to form a stud blank substantially as shown in Fig. 4, with the inner end portion of the stud body substantially in the form of a conoid 50 having a frusto-conical base. Alternatively, a blank of the same shape may be formed from wire stock by a cold forging or compressing operation. The conoidal end portion of the blank is then cold-forged or deformed in a die or by other suitable means to the finished shape or form just described, as illustrated in Fig. 5. After that the stud is heat treated and quenched to add hardness and strength.

It will be apparent that when a cowl sheet equipped with such a stud element, as illustrated in Fig. 3b, is placed in fastening relation to a supporting sheet equipped with a cooperating spring element, as illustrated in Fig. 3a, and the stud element is thereupon turned in a clockwise direction, the inclined lower surfaces 19 of the stud arms engage against the in-turned cam lips 42 and then ride in an arcuate path along the cam surfaces 43, over the humps 44, and into fastening position in the radial grooves 45, beyond which they are prevented from turning by the projections 46. This relative movement of the stud element is accompanied by movement of the central portion 32 of the spring strip toward sheet 6 against the yielding resistance of the resilient portions 33, and by a corresponding sliding movement of the end portions 34, so that the fastener remains engaged with the spring strip under stress, as shown in Fig. 2, until the stud element is turned in a counter-clockwise direction to disengage it and permit separation of the two sheets.

The dome-shaped formation of the fastening structure at the end of the stud element serves as a guide or cam enabling the stud element to assume its proper fastening relation to the spring element whenever the sheets are disposed together, without becoming hung or caught on the dimpling 8 or other constructions; and whenever the fastener is disengaged and the sheets are separated the inclined lower surfaces 19 of the nose-like stud arms act as cams or guides enabling the sheets to be separated without difficulty from catching or hanging of the arms against the dimpling or other obstructions. In other words, the stud-fastening structure is entirely freed of sharp corners and abrupt angles such as heretofore have caused trouble in the use of such fasteners, and in consequence a plurality of fasteners embodying the new stud construction may be used to fasten curved cowl sheets without any difficulty. A further feature of the new construction is that the noses 16 possess a greater ultimate strength than the radial arms of prior stud constructions, by reason of their larger bases and their integral formation with the stud body. Moreover, the lower surfaces 19 provide a larger area of bearing surface to distribute the strain of the stud on the spring element when the fastener is engaged.

The improved stud construction is formed completely by machining and forging operations, or successive forging operations, which together are performed more quickly and less expensively than the machining, drilling and assembling operations heretofore used. Yet the product is superior in strength, operation and reliability to prior art stud constructions, and it can be made of carbon steel or other suitable stock and can be heat treated and quenched without danger of becoming faulty.

The modified form of stud construction illustrated in Figure 6 is made and operates in substantially the same way as the other form, but it differs from the latter in that the leading side or face 22ª of each nose-shaped stud arm is spiral or arcuate in longitudinal direction such that it merges smoothly into the curvature of the lower surface 19ª, instead of being substantially flat and parallel to the stud axis. This affords greater "pick-up" to the fastener—i. e., the stud and spring elements can be engaged together and started moving into fastened relation, with faces 22ª touching the cam lips 42 (see Fig. 2), when the sheets carrying the respective elements are spaced farther apart than is the case when using the form first described. This is particularly advantageous where a number of the fasteners are used on curved sheets, which often are quite difficult to move close enough together to engage all of the fasteners. This modified form also gives a smoother fastening action, with less friction and less wear, since the spiral or cam surfaces 22ª of the stud are better matched to the necessary cam surfaces 43, or the like, of the spring element.

While I have illustrated and described the details of a preferred embodiment of my invention, it will be understood that the invention is restricted only by the substance of the disclosure and the fair requirements of the appended claims.

I claim:

1. In a stud and spring type fastener for cowling or the like, a rotary stud element having a head at one end to be engaged and turned by a tool, a domed other end and a plurality of integral radial arms adjacent to and merging into said domed end and formed as noses each having inclined, rounded upper and lower surfaces and a rounded end, the said domed end and rounded upper surfaces constituting means to guide the element through an aperture of a cooperating spring strip element, the said lower surfaces constituting cam and bearing means to cooperate with cam and radial groove means of such a spring element, and the said upper and lower surfaces and rounded ends also constituting means to avoid hanging of the stud arms onto other structure when unfastening and removing cowling or the like carrying the stud element.

2. In a stud and spring type fastener for cowling or the like, a rotary stud element having a head at one end made to be engaged and turned by a tool and radial arms formed integrally therewith near its other end to cooperate with cam and radial groove means of a cooperating spring element, said arms formed as noses each having upper and lower transversely-rounded edges inclined longitudinally, in opposite directions, with respect to the axis of the stud and converging to a common rounded nose end, together with side faces which merge into the body of the stud from said edges.

3. In a stud and spring type fastener for cowling or the like, a rotary stud element having a head at one end to be engaged and turned by a tool and integral radial arms near its other end, which is dome-shaped, to cooperate with cam and groove means of a cooperating spring element, said arms formed as noses each having a transversely-rounded inclined upper surface substantially tangent to the domed end and a transversely-rounded, oppositely-inclined lower surface converging with said upper surface into a rounded nose end.

4. A rotary stud element for a stud and spring type fastener, having a dome-shaped end and integral oppositely-disposed radial arms adjacent said end to cooperate with cam and groove means of a cooperating spring element, said arms formed as noses each having a transversely-rounded upper surface inclined longitudinally with respect to the axis of the stud and substantially tangent to said domed end and merging smoothly therewith, a transversely-rounded, oppositely-inclined lower surface converging with said upper surface into a rounded arm end, and side faces constituting lateral continuations of said surfaces which merge into the body of the stud.

5. A rotary stud element as described in claim 4 wherein the leading side face of each arm is substantially flat and substantially parallel to the stud axis and merges at an angle into the stud body, whereby to abut positively against a stop on the cooperating spring element.

6. A rotary stud as described in claim 4 wherein the leading side face of each arm is substantially flat and substantially parallel to the stud axis and merges at an angle into the stud body, and the other side face of each arm is curved and blends substantially tangentially into the stud body.

7. A rotary stud as described in claim 4 wherein the leading side face of each arm in transverse direction is substantially normal to the stud axis and in longitudinal direction is spirally convex such that it merges smoothly into said lower surface.

MICHAEL J. ZALESKE.